United States Patent [19]

Schirmer

[11] Patent Number: 4,803,122
[45] Date of Patent: Feb. 7, 1989

[54] MULTILAYER LAMINATE OF SELF SUPPORTING FILMS

[75] Inventor: Henry G. Schirmer, Spartanburg, S.C.

[73] Assignee: W. R. Grace & Co., Duncan, S.C.

[21] Appl. No.: 20,291

[22] Filed: Feb. 27, 1987

Related U.S. Application Data

[62] Division of Ser. No. 786,898, Oct. 11, 1985, Pat. No. 4,778,557.

[51] Int. Cl.$^4$ .................. B32B 27/00; B32B 27/32
[52] U.S. Cl. .................. 428/349; 428/476.1; 428/516; 428/518; 428/910; 428/483; 428/520; 156/379.8; 427/39
[58] Field of Search .............. 428/516, 518, 476.1, 428/349, 483, 520

[56] References Cited

U.S. PATENT DOCUMENTS

| | | | |
|---|---|---|---|
| 3,348,022 | 10/1967 | Schirmer | 219/384 |
| 3,506,744 | 4/1970 | Talbert | 264/22 |
| 3,882,259 | 5/1975 | Nohara et al. | 428/516 |
| 3,959,567 | 5/1976 | Bradley | 428/461 |
| 4,178,401 | 12/1979 | Weinberg et al. | 428/483 |
| 4,188,443 | 2/1980 | Mueller et al. | 428/483 |
| 4,207,363 | 6/1980 | Lustig et al. | 428/216 |
| 4,223,074 | 9/1980 | Yoshida et al. | 428/469 |
| 4,424,243 | 1/1984 | Nishimoto et al. | 428/516 |
| 4,451,599 | 5/1984 | Odorzynski | 524/169 |
| 4,452,846 | 6/1984 | Akao | 428/500 |
| 4,484,971 | 11/1984 | Wang | 156/244.14 |
| 4,684,573 | 8/1987 | Mueller et al. | 428/349 |

Primary Examiner—P. C. IVes
Attorney, Agent, or Firm—John J. Toney; William D. Lee, Jr.; Mark B. Quatt

[57] ABSTRACT

Discrete, self-supporting films are adhered together to form a unique laminate. The surface or outer self-supporting films comprise heat-sealable thermoplastic material, and one interior self-supporting film is adhered to one outer films and comprises an oxygen barrier material. An optional interior film may be adhered to the barrier film to add strength to the laminate. At least one of the films is oriented and the laminate has a thickness of at least about 10 mils. A preferred method of bonding or adhering the films together is by means of corona discharge treatment. The resulting film is characterized by shrinkability and high strength.

7 Claims, 1 Drawing Sheet

MULTILAYER LAMINATE OF SELF SUPPORTING FILMS

This is a divisional application of application Ser. No. 786,898, filed on Oct. 11, 1985, now U.S. Pat. No. 4,778,557.

BACKGROUND OF THE INVENTION

This invention relates generally to laminate films and more specifically to laminate films in which individual layers of the laminate are bonded together by means of corona discharge treatment. This invention also relates to an apparatus for producing a multilayer laminate utilizing corona discharge treatment, and a method for producing such a laminate.

The use of corona discharge treatment is well known in connection with preparing polyolefin surfaces for printing inks, and for preparing laminated plastic films.

Thick, oriented polyolefin sheets of for example about 10 mils or greater, have been virtually unknown because of the complexities of orienting materials this thick. While it is possible to use conventional laminating techniques for producing relatively thick polyolefin laminates, such a method is quite costly.

The laminate could be passed through a single stage corona discharge treatment to rpoduce the thick laminate, but it has been observed that treatment level changes as dielectric material builds up in the laminate, and the permissible thickness of the resulting laminate is thereby limited.

Of interest in U.S. Pat. No. 3,171,539 issued to Holbrook et al and showing the treatment of both sides of an irradiated, biaxially oriented polyethylene to ensure bonding when the upper surface of the polyethylene material is contacted with its lower surface.

Also of interest is U.S. Pat. No. 3,575,793 issued to Paisley which discloses the use of a biaxially oriented polypropuylene layer which is corona bonded to a cellophane layer which has been coated with saran. Additional outside layers of polymeric material may be laminated or coated to the opposite surfaces of the polypropylene or the cellophane. A bond is formed between the corona treated surface of the polypropylene and the saran coating of the cellophane material.

Of interest is Canadian Patent Specification 1472376 issued to Dawes et al and discussing corona treating of facing surfaces of various polymeric materials, including ethylene homopolymers and copolymers, polyamides, and ionomers, and coating these materials with polyvinylidene chloride. In one embodiment, polyhexamethylene adipamide is treated on both of its surfaces with corona discharge and sandwiched by outside layers of ethylene butylene copolymer. All of the materials of this embodiment are blown films.

It is desirable to conveniently produce at relatively low cost, in a continuous fashion, a relatively thick laminate preferably containing one or more component layers of oriented materials, or a laminate in which all the layers are oriented.

OBJECTS OF THE INVENTION

It is, therefore, an object of the invention to provide a relatively thick laminate by the use of corona discharge treatment of each of the layers of the laminate.

It is a further object of the present invention to provide such a laminate having one or more oriented layers.

It is yet another object of the invention to provide a method for producing a relatively thick multilayer laminate comprising either the simultaneous or sequential treatment of layers of thermoplastic material, one or more of which may be oriented, with corona discharge to provide a thick laminate characterized by shrinkability and/or high strength, and in which adequate interlayer bonding is achieved by the use of corona discharge.

It is a further object of the present invention to provide an apparatus for making a relatively thick multilayer lamiante, one or more layers of which may be oriented, which provides a relatively low cost and efficient means of producing such a laminate.

DEFINITIONS

The terms "corona discharge treatment", "corona treating" and the like as used herein refer to subjecting the surfaces of thermoplastic materials, such as polyolefins, to corona discharge, i.e. the ionization of a gas such as air in close proximity to a film surface, the ionization initiated by a high voltage passed through a nearby electrode, and causing oxidation and other changes to the film surface.

The terms "acid- or acid anhydride-modified polymeric materials" and the like, as used herein, refer to materials suitable for use as adhesives and which preferably include a graft copolymer of a polyolefin, such as polyethylene, or ethylene-ester copolymer substrate and an unsaturated carboxylic acid or acid anhydride, blended with a polyolefin, such as polyethylene, or ethylene-ester copolymer.

The term "heat set" and the like as used herein describes a process step involving orienting a film or film layer and thereafter raising the temperature of the film or film layer to near its orientation temperature in order to provide a film with little or no shrink characteristics.

The term "linear low density polyethylene" as used herein refers to copolymers of ethylene with one or more eomonomers selected from $C_4$ to $c_{10}$ alpha olefins such as butene-1, octene, etc. in which the molecules of the copolymer comprise long changes with few, relatively short side chains, branches, or cross-linked structures. Linear low density polyethylenes as defined herein have a density usually in the range of from about 0.916 grams per cubic centimeter to about 0.925 grams per cubic centimeter. Density should be measured in accordance with ASTM D 1505-68.

The term "ethylene vinyl acetate copolymer" as used herein refers to a copolymer formed from ethylene and vinyl acetate monomers wherein the ethylene derived units in the copolymer are present in major amounts, generally from about 60% to 98% by weight, and the vinyl acetate derived units in the copolymer are present in minor amounts, generally from 2% to 40% by weight.

The term "relatively thick" as used herein describes the overall thickness of a laminate produced in accordance with the present invention. Although thicknesses of ten (10) mils or greater are generally contemplated, thicknesses somewhat less than ten mils may also be included in laminates characterized by the presence of one or more layers of oriented material, which laminates would be difficult or impossible to produce except by either conventional laminating techniques or by the practice of the present invention.

SUMMARY OF THE INVENTION

In accordance with the present invention, a method for making a relatively thick multilayer laminate comprises corona treating a first and second outer layer of a thermoplastic material on one surface thereof; corona treating at least one interior layer of a thermoplastic material on both surfaces thereof; and bringing the treated surfaces of the first and second outer layers, and the at least one interior layer, into respective contact with each other such that the untreated surfaces of the first and second outer layers form the outside surfaces of the resulting laminate.

In another aspect of the present invention, a relatively thick multilayer laminate comprises a first or sealant layer; a second or barrier layer adhered to the first layer; a third layer adhered to the second or barrier layer, the third layer comprising a polymeric material which adds strength to the resulting laminate; and a fourth or sealant layer adhered to the third layer.

In still another aspect of the present invention, an apparatus for making a multilayer laminate comprises a series of film feed means each film feed means providing a layer of thermoplastic material; means for supplying film from each of the feed means to a respective corona discharge station; corona discharge means for corona treating both sides of each layer representing an interior layer of the resulting laminate; corona discharge means for corona treating one side of a first and second layer representing outside layers of the resulting laminate; and gathering means for bringing the treated surfaces of the layers into respective contact with each other such that the treated surfaces of contiguous layers bond together, and the untreated surfaces of the first and second outer layers form the outside surfaces of the resulting laminate.

BRIEF DESCRIPTION OF THE DRAWINGS

Further details are given below with reference to the drawings wherein.

DESCRIPTION OF THE PREFERRED EMBODIMENTS

Figure 1:
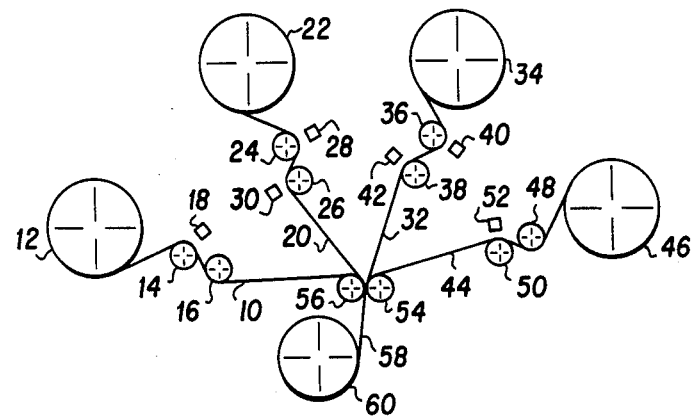
FIG. 1 is a schematic view of a preferred embodiment of an apparatus for making a relatively thick multilayer laminate.

Referring specifically to the drawings, in FIG. 1 a schematic view of a preferred embodiment of an apparatus for making a relatively thick multilayer laminate is shown. Film feed rolls 12, 22, 34, and 46 hold films 10, 20, 32, and 44 respectively. In accordance with the practice of the present invention, each of films 10, 20, 32, and 44 are fed from their respective feed rolls and passed over a corresponding rubber insulated roll 14, 24, 36 and 48. As described further below, the terms "film" and "layer" are used interchangeably to describe individual components of the laminate.

Either of two types of corona treatment may be employed. A bare electrode may be used in combination with an insulated roll, e.g. a rubber insulated roll. Alternatively, a glass electrode may be used in conjunction with a bar metal roll. In the description of the preferred embodiments, when rubber insulated rolls are described, these are used with bare electrodes. It should be understood, however, that this combination is interchangeable with bare metal rolls and glass electrodes. In an actual working example, both combinations were used in a single apparatus.

One surface of the first or outer layer 10 is subjected to corona discharge aas it passes over rubber insulated roll 14, a corona unit or station 18 being located in close proximity to insulated roll 14. Likewise film 20, 32 and 44 are carried over insulated rolls 24, 36 and 48 respectively. One surface of film 20 is subjected to corona treatment as it passes over roll 24 in close proximity to corona unit 28. Similarly, one surface of film 32 is subjected to corona treatment as it passes over roll 36 in close proximity to corona unit 40.

The second or outer layer 44 is passed over insulated roll 48 but is not subjected to corona treatment on the exposed surface of the film in order to provide an outer layer with an untreated outside surface in the resulting laminate.

Referring back to the first or outer layer 10, of FIG. 1, after initial treatment at corona unit 18, the film 10 passes over a second insulated roll 16 but is not subjected to corona treatment on its second surface. This thereby provides a first or outer layer with an outside surface which has not been treated by corona discharge. This untreated outside surface will form one of the outside surfaces of the resulting laminate.

Films 20 and 32, after initial treatment are fed over second insulating rolls 26 and 38 respectively, in close proximity to corona units 30 and 42 respectively, to treat the other surface of those films.

Film 44 is passed over insulating rolls 50 in close proximity to corona unit 52 which treats the surface of the second or outer layer 44 which will subsequently bond to one of the treated surfaces of film 32.

The four films of the preferred embodiment are fed substantially at the same time past the corona units and gathered at pinch rolls 54 and 56. These rolls are preferably heated to a temperature ranging between about 150° F. and 200° F., and more preferably at a temperature of about 175° F. The gathered films are also put under pressure of about 150 to 250 pounds per linear inch and more preferably about 200 pounds per linear inch. As the films are gathered at pinch rolls 54 and 56, respective contiguous corona treated surfaces of films 10, 20, 32, and 44 bond together.

The corona bonded laminate 58 emerges from the pinch rolls 54 and 56 and is gathered on take-up roll 60.

Figure 2:
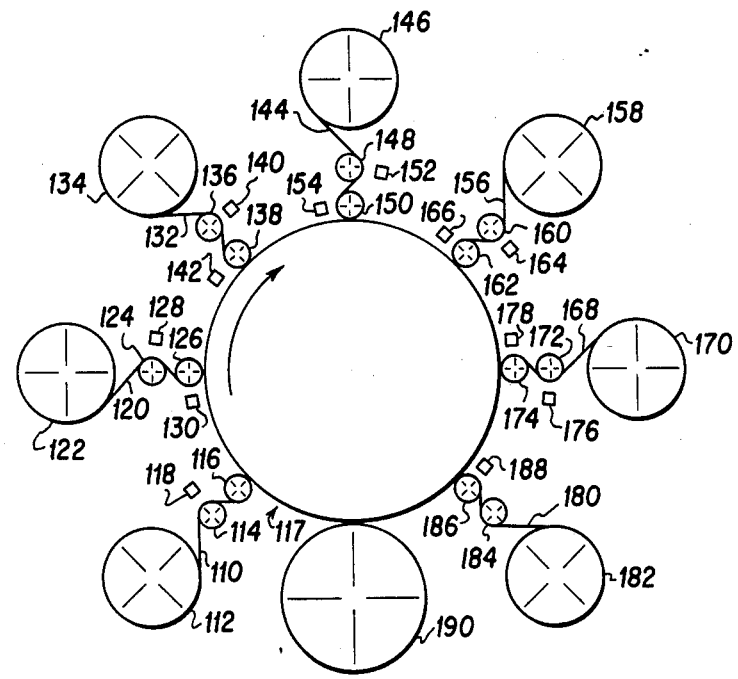
FIG. 2 is a schematic view of an alternate embodiment of an apparatus in accordance with the present invention.

In an alternate embodiment, a multilayered laminate having several layers may be produced substantially as described above, but is produced in relative sequential fashion as shown in FIG. 2. Thus, film 110 is fed from film feed roll 112 over insulated roll 114 and passes in close proximity to a corona unit 118 where one surface of film 110 is coron treated. The film 110, now treated on one surface thereof, is fed around a press roll 116 onto a laminating drum 117.

Film 120 is fed from film feed roll 122 and over insulated roll 124 where it receives corona treatment from corona unit 128. Film 120 is then passed over press roll 126 where the opposite surface of the film is subjected to corona treatment from corona unit 130. Film 120, having been treated on both of its surfaces, is then brough into contact with the treated surface of advancing film 110 on laminating drum 117 to bond films 110 and 120 together at their interface.

Film 132 is fed from feed roll 134 and around insulated roll 136 where one surface of film 132 is treated by corona discharge from corona unit 140. Film 132 is then passed over press roll 138 where the other surface of film 132 is treated by corona unit 142, after which film 132 is bonded to film 120 as it is advanced along laminating drum 117.

The now three layer laminate comprising films 110, 120 and 130 is advanced along laminating drum 173 in the direction of the arrow shown in FIG. 2. Film 144 is advanced from feed roll 146 and over insulated roll 148 and press roll 150, treated by corona discharge from corona units 152 and 154 respectively, and bonded to the three-layer laminate to create a four-layer laminate.

The four-layer laminate is advanced further along the surface of laminating drum 117. Film 156, fed from feed roll 158, is corona treated on both of its surfaces by corona units 164 and 166 as it passes over insulated roll 160 and press roll 162 respectively. Film 156 is thereafter bonded to the advancing laminate.

Film 168, advanced from feed roll 170, is corona treated by corona unit 176 as it passes over insulated roll 172 and by corona unit 178 as it passes around press roll 174. Film 168 is therefter bonded to the advancing laminate along laminating drum 117.

Finally, the second or outer layer 180 advances from feed roll 182 and is passed over insulating roll 184 and around press roll 186 where one surface of film 180 is subjected to corona treatment by corona unit 188. Film 180 thereafter is bonded to the advancing laminate and forms a second outer layer thereof. The total laminate consists of 7 film layers adhered together.

The now constructed laminate is taken upon finished roll 190.

This method has the advantage of providing better heat transfer to each of the 7 films laminated since press rolls 116, 126, 138, 150, 162, 174, and 186 can be individually heated.

A wide range of polymeric materials is suitable for use in connection with the multi-stage laminator. A preferred laminate structure includes four layers of extruded films. This four-layer laminate was produced on the apparatus depicted in FIG. 1. Referring to that drawing, film feed roll 12 held a sealant layer 10 comprising a coextruded film having a first layer of linear low density polyethylene and a second layer of ethylene vinyl acetate copolymer (EVA). The EVA has a vinyl acetate content of about 4.5% by weight, and a melt index of about 10 grams/10 minutes to insure a very smooth surface.

This sealant layer 10 was subjected to corona discharge along its EVA surface. At substantially the same time, a barrier layer 20 was fed from film feed roll 22 and corona treated on both surfaces thereof. Barrier layer 20 is a coextruded film having a first layer of EVA (4-½% vinyl acetate, melt index=10 gms/10 minutes); a second layer of EVA (17% vinyl acetate, melt index=3 gms/10 minutes); a third layer of cinylidene chloride/-vinyl chloride copolymer (saran); a fourth layer of acid anhydride-modified EVA (CXA-162); a fifth layer of ethylene vinyl alcohol copolymer; a sixth layer as in the fourth layer; and a seventh layer of EVA (4-½% vinyl acetate, melt index=10 gms/10 minutes).

A third layer 32 comprising oriented heat set polyethylene terephthalate, and a sealant layer 44 substantially identical to sealant layer 10 were also fed from film feed rolls 34 and 46 respectively.

Third layer 32 could optionally be a nylon or other polymeric material which would add strength to the laminate, and was corona treated on both surfaces thereof.

Fourth layer 44 was corona treated only on one surface. Fourth layer 44 included an ethylene vinyl acetate of 4-½% vinyl acetate content by weight, and a melt index of 10 gms/10 minutes; and an outer surface of linear low density polyethylene.

The four layers 10, 20, 32, and 44 were gathered at pinch rolls 54 and 56, under heat (175° F.) and pressure (200 pounds per linear inch) to form a laminate of about 4 mils total thickness.

It is emphasized that one or more, or all of the layers making up the laminate may be oriented. In a case where all or substantially all of the layers of a relatively thick, i.e., 10 mils or greater thickness laminate are oriented, a laminate results which is essentially unobtainable through coextrusion technology because of the difficulties of orienting very thick materials. The present invention also provides a more economical approach than the conventional laminating techniques well known in the art. An additional advantage of the present invention is the use of a multiple corona unit to avoid the dielectric material build-up which occurs when multiple passage through a single stage corona unit is used to produce a thick laminate material.

Although the present invention has been described in conjunction with preferred embodiments, it is to be understood that modifications and variations may be made without departing from the spirit and scope of the invention, such modifications and variations being readily made by those skilled in the art. For example, it is readily apparent that the number of film feed rolls utilized in connection with the invention may be varied depending on the number of layers of polymeric material making up the desired laminate. Onr or more film layers may optionally be irradiated. Accordingly, such modifications may be practiced within the scope of the following claims.

What is claimed is:

1. A laminate comprising:
  (a) a first self-supporting outer film comprising a thermoplastic heat sealable material;
  (b) a second self-supporting film comprising an oxygen barrier thermoplastic material, said second film adhered to the first film;
  (c) a third self-supporting outer film comprising a thermoplastic heat sealable material; and
  (d) wherein the lamiante has a thickness of at least about 10 mils, and at least one of the films is oriented.

2. The laminate according to claim 1 wherein the first film comprises a first layer of linear low density polyethylene and a second layer of ethylene vinyl acetate copolymer.

3. The laminate according to claim 1 wherein the second film comprises a first layer of ethylene vinyl acetate copolymer, a second layer of ethylene vinyl acetate copolymer, a third layer of vinyl chloride vinylidene chloride copolymer, a fourth layer of an anhydride-modified ethylene vinyl acetate copolymer, a fifth layer of ethylene vinyl alcohol copolymer, a sixth layer as in the fourth layer, and a seventh layer of ethylene vinyl acetate copolymer.

4. The laminate according to claim 1 further comprising an additional film comprising a polymeric material selected from the group consisting of oriented heat set polyethylene terephthalate and nylon, said additional film disposed between and bonded to the second and third films.

5. The laminate according to claim 1 wherein the third film comprises a first layer comprising ehtylene vinyl acetate copolymer, and a second layer comprising linear low density polyethylene.

6. The laminate according to claim 1 further comprising an additional barrier film.

7. The laminate according to claim 6 wherein the additional barrier film consists essentially of the same composition as the barrier film of claim 3.

* * * * *

UNITED STATES PATENT OFFICE
CERTIFICATE OF CORRECTION

PATENT NO. : 4,803,122
DATED : 2/7/89
INVENTOR(S) : H. G. Schirmer

It is certified that error appears in the above-identified patent and that said Letters Patent is hereby corrected as shown below:

In column 6, line 47, "lamiante" should read --laminate--.

Signed and Sealed this

Twentieth Day of June, 1989

Attest:

DONALD J. QUIGG

*Attesting Officer*  *Commissioner of Patents and Trademarks*